July 16, 1963 J. A. MILLS 3,097,566
GEAR FINISHING MACHINES
Filed June 20, 1960 9 Sheets-Sheet 1

July 16, 1963 J. A. MILLS 3,097,566
GEAR FINISHING MACHINES
Filed June 20, 1960 9 Sheets-Sheet 2

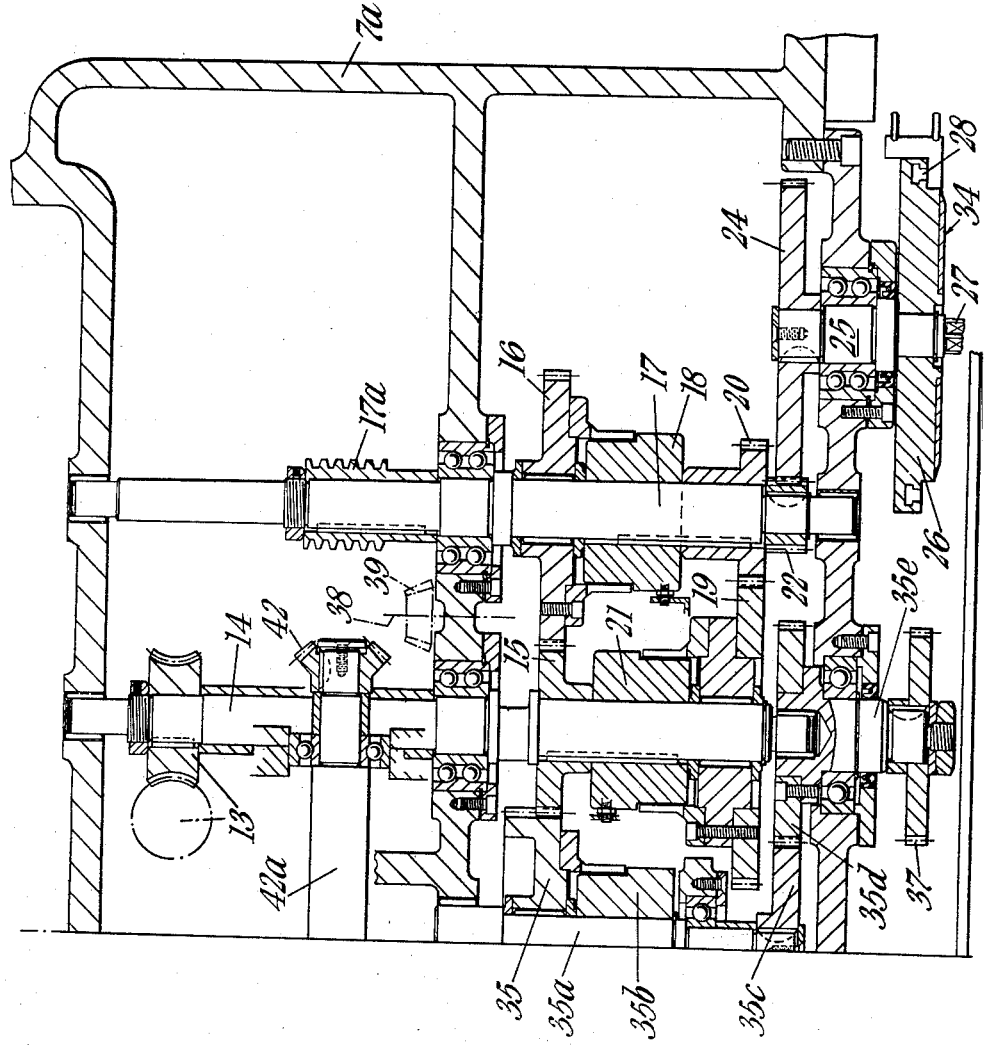

July 16, 1963

J. A. MILLS 3,097,566

GEAR FINISHING MACHINES

Filed June 20, 1960

3,097,566
GEAR FINISHING MACHINES
John Alfred Mills, 24 Kingsley Ave., North Gosforth, Newcastle-upon-Tyne, England
Filed June 20, 1960, Ser. No. 37,249
Claims priority, application Great Britain Feb. 15, 1960
5 Claims. (Cl. 90—1.6)

This invention has reference to gear shaving machines of the kind provided with means to rotatably support a gear to be finished, means to rotatably support a rotary tool having teeth conjugate with the gear, such tool being known as a gear shaving cutter, driving means to rotate one of said supporting means, a table to support one of the supporting means, a knee supporting the table, a traverse feed screw by which the table can be traversed relative to the knee and an in-feed screw by which the one of said supporting means is fed towards the other supporting means and, after the gear finishing operation, returned to its initial position, means being provided to rotate the feed screws.

In such machines as presently constructed means are provided by which the knee is given a fast initial in-feed followed by relatively small slow in-feed increments which take place at the ends of the table traverse strokes.

The present invention has for its object to provide in machines of the kind set forth improved means for controlling the in-feed and the traverse feed of the table.

According to the present invention a machine of the kind set forth is provided with a single reversible motor by which the in-feed and traverse feed screws are rotated, gearing introduced between the motor and in-feed screw to give an initial quick in-feed and a relatively slow in-feed, a first electro-magnetic incorporated in said gearing and clutch energised on closing the motor circuit to transmit a quick in-feed, a second electro-magnetic clutch also incorporated in said gearing to transmit a relatively slow in-feed, switch operating means rotated in synchronism with the in-feed screw and which has a rotational position corresponding to the in-feed position of the table, a switch operated by the switch operating means to de-energize the energised clutch and thereby interrupt the in-feed, reversible gearing introduced between the motor and the traverse feed screw, further electro-magnetic clutches introduced in the reversible gearing and controlling the direction of drive transmitted by said gearing, further switch operating means rotated in synchronism with and in a direction corresponding to the traverse of the table and a switch operated by said switch operating means and which, when contacted, reverses the energising of the clutches in the traverse gearing and energises the clutch through which the slow in-feed is transmitted, the construction and arrangement giving a quick initial in-feed and thereafter a relatively slow and short in-feed increment synchronized with the reversal of the traverse of the table.

The invention further consists in a machine as set forth in the preceding paragraph wherein the switch operating means rotated in synchronism with the in-feed comprises a rotary member provided with a plurality of trip dogs adjustably secured to the disc, each trip dog in turn contacting the switch to arrest the in-feed of the table and the position of the trip dogs relative to each other determining the extent of successive increments of in-feed.

The said rotary member may be provided with a trip dog which after the last increment of in-feed contacts a switch which gives a signal by which the table can be given any number of traverses without in-feed.

Further said rotary member may be provided with a still further trip dog which contacts a further switch which, when the table is lowered, de-energises the energised clutch and cuts out the motor.

The switch operating means rotated in synchronism with the traverse of the table is conveniently in the form of a rotary member having adjustable thereon trip dogs to operate the reversible switch, said trip dogs being circumferentially adjustable to determine the points of reversal.

A preferred embodiment of the invention will now be described with reference to the accompanying drawings wherein.

Figure 1:
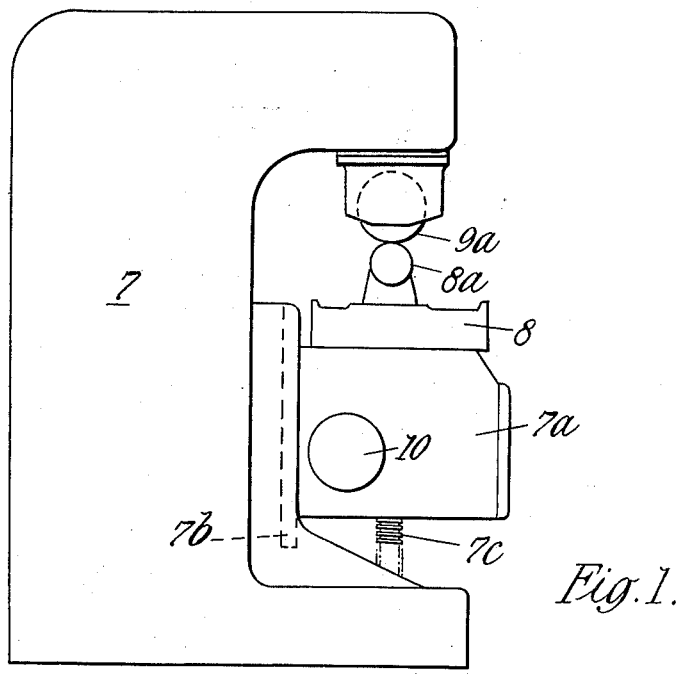
FIGURE 1 is a side elevation of a gear shaving machine of the kind set forth.
Figure 9:
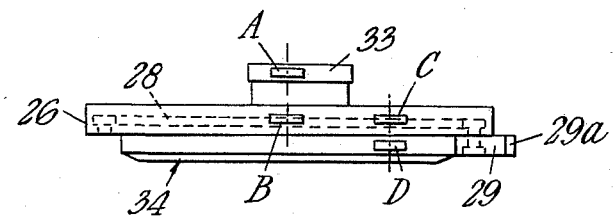
Figure 10:
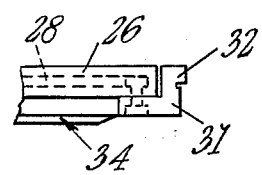
Figure 3A:
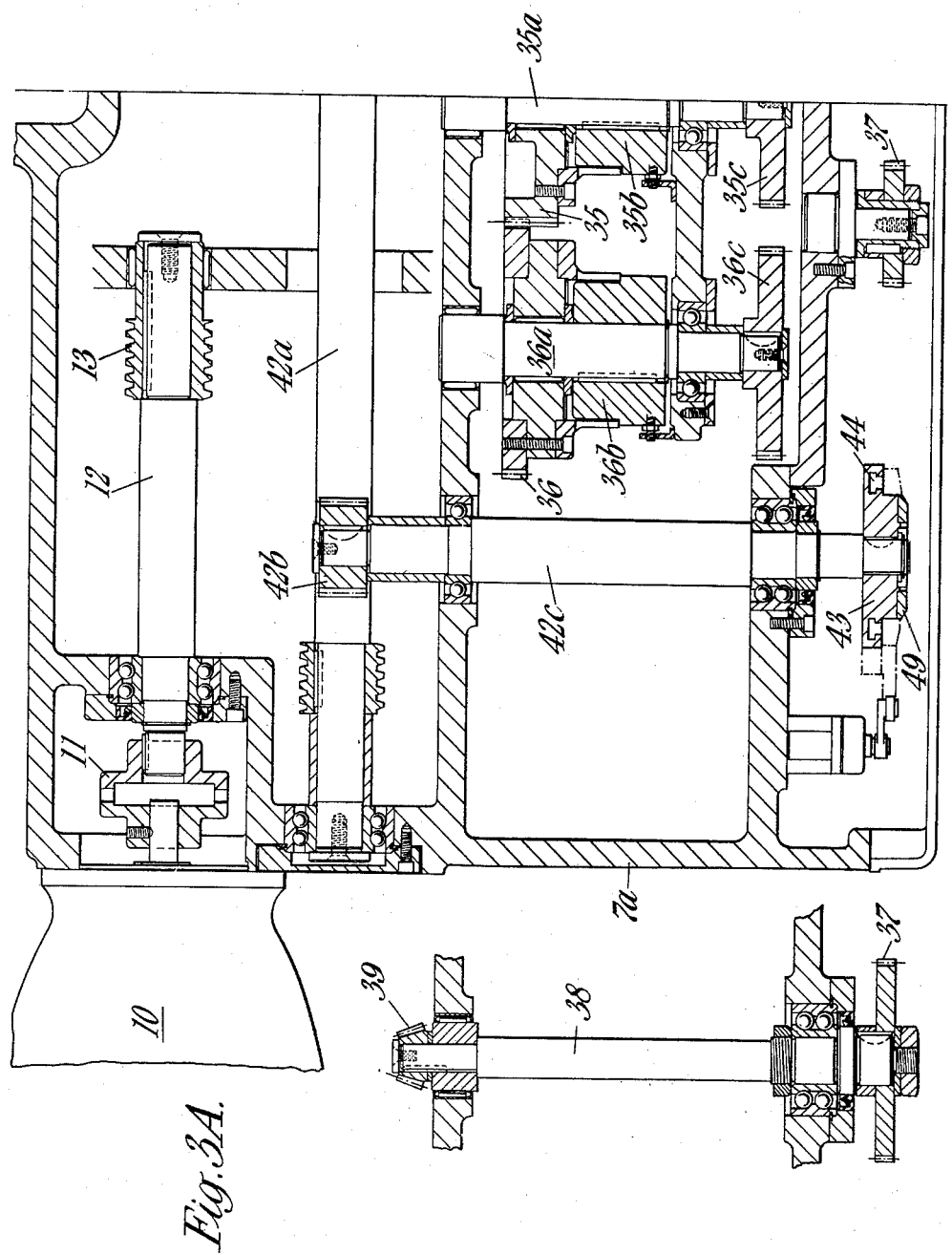
Figure 4:
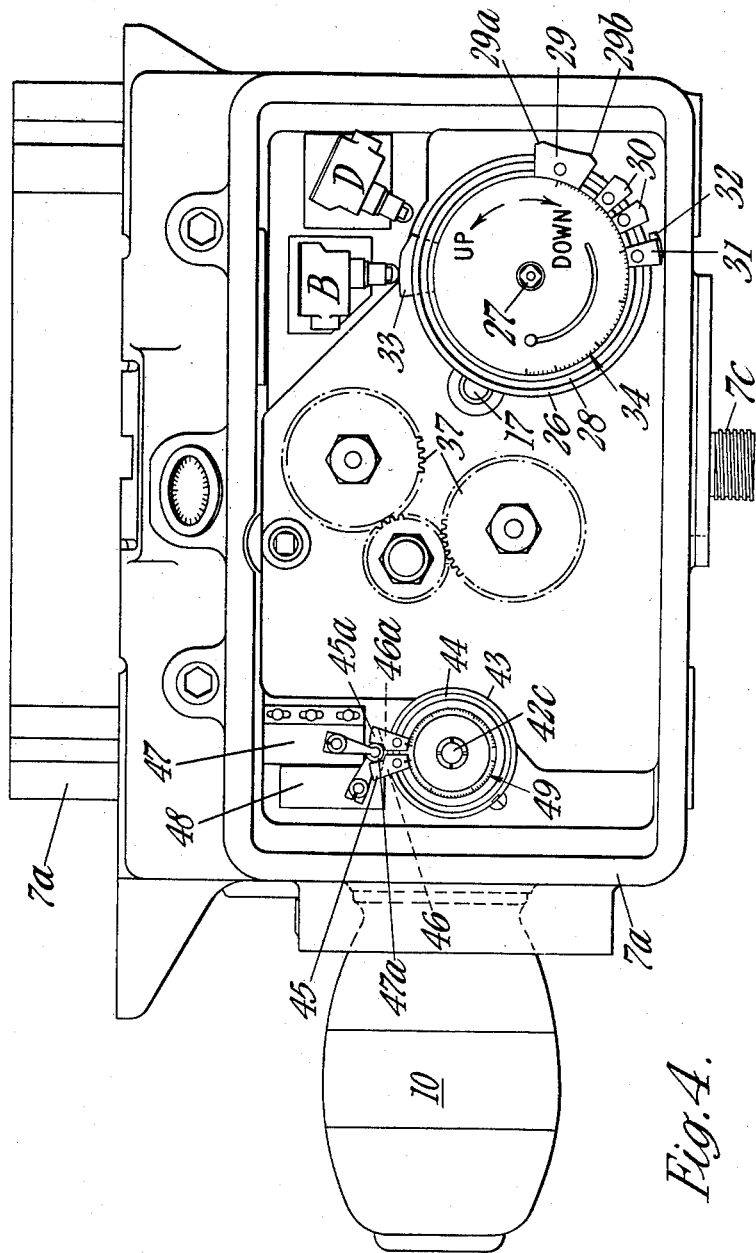
Figure 5:
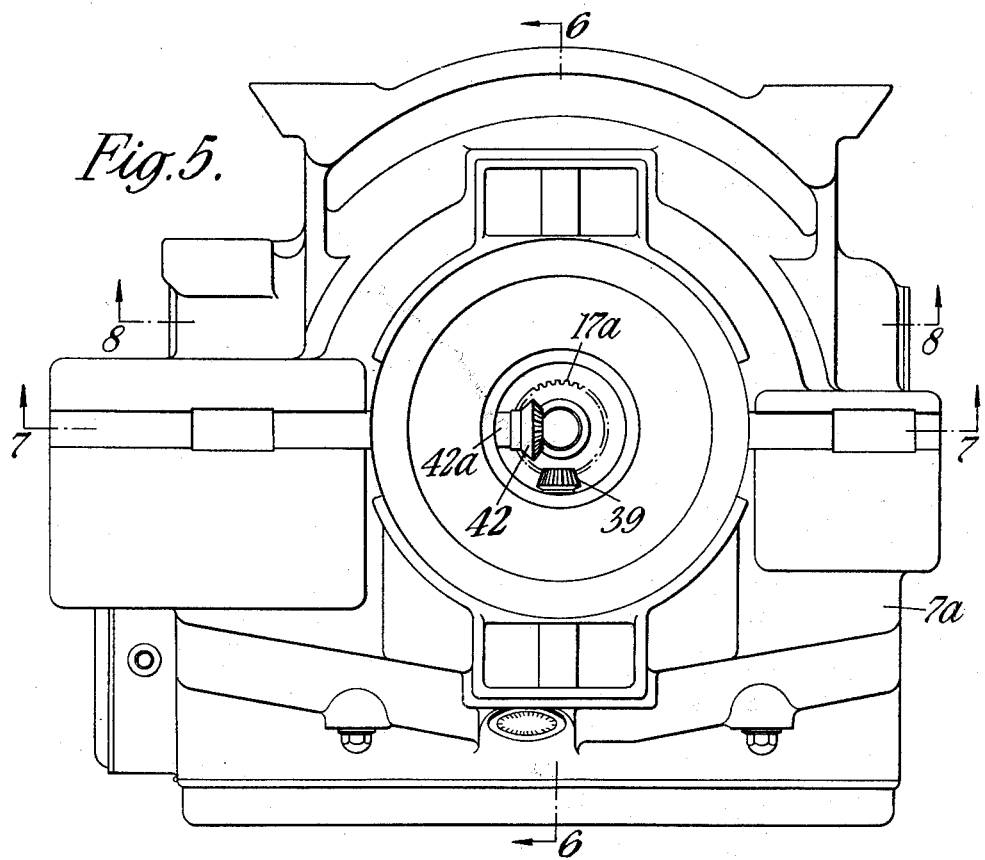
Figure 6:
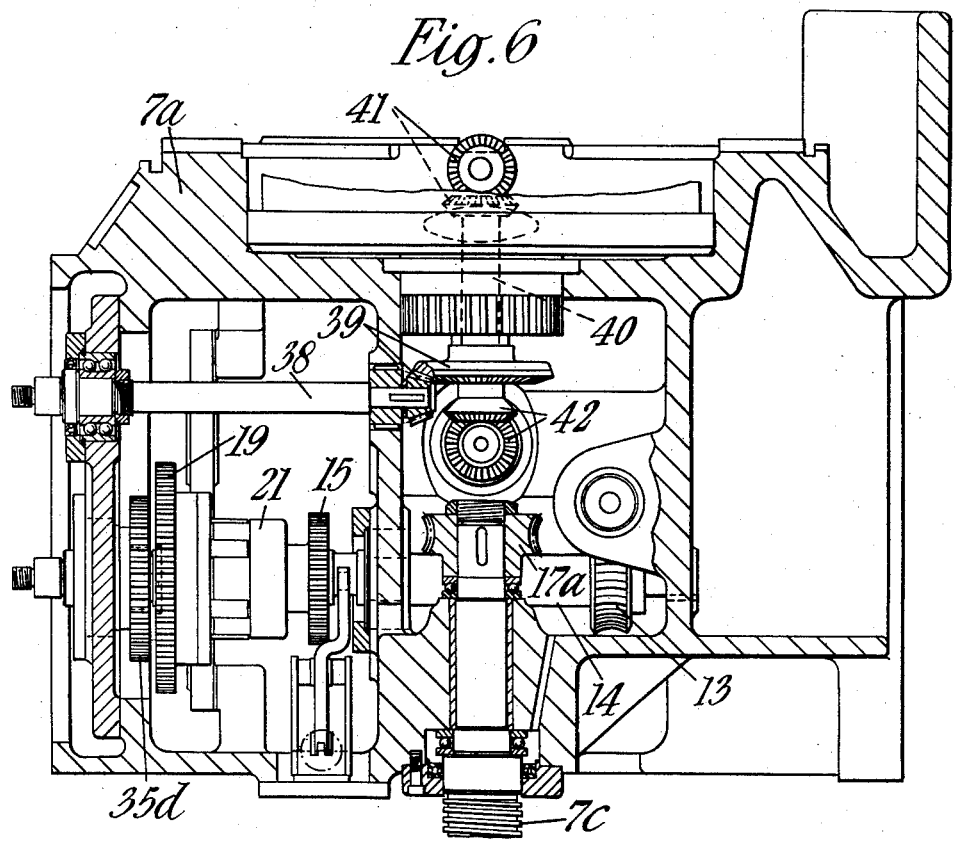
Figure 7:
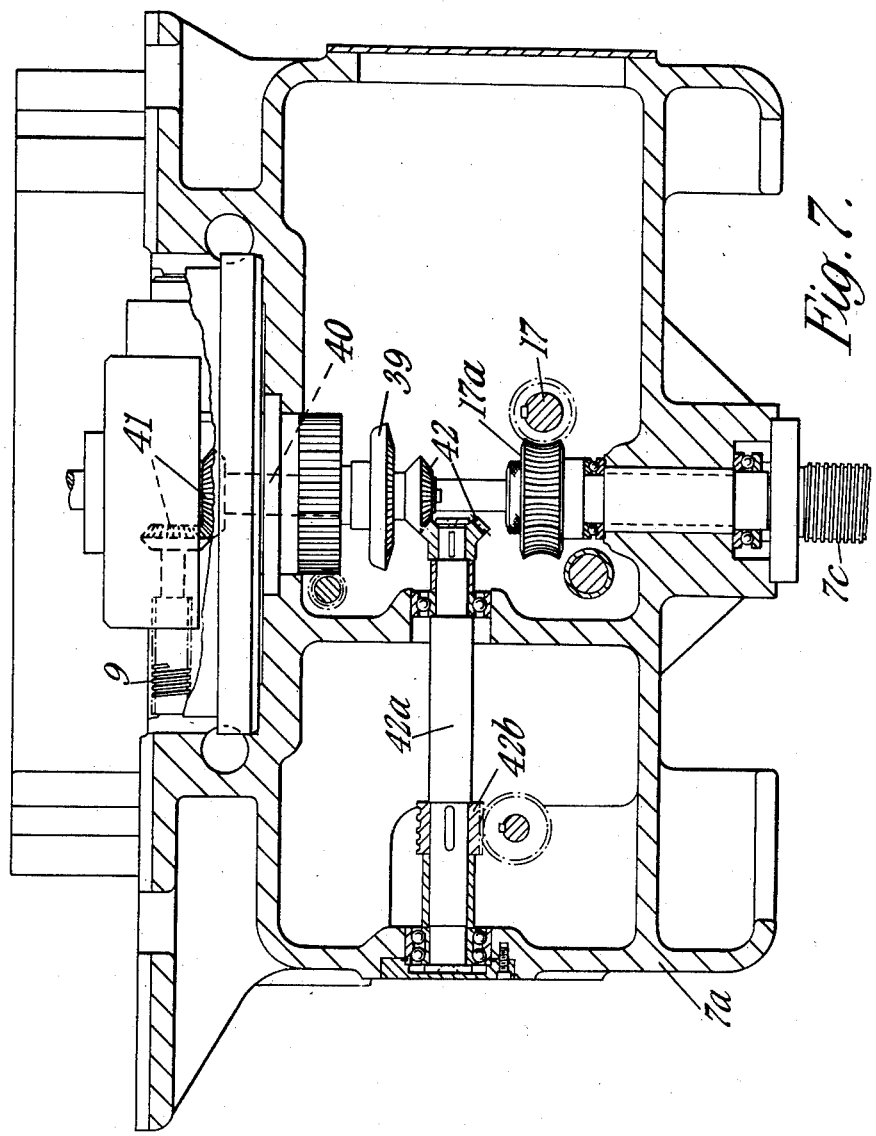
Figure 8:
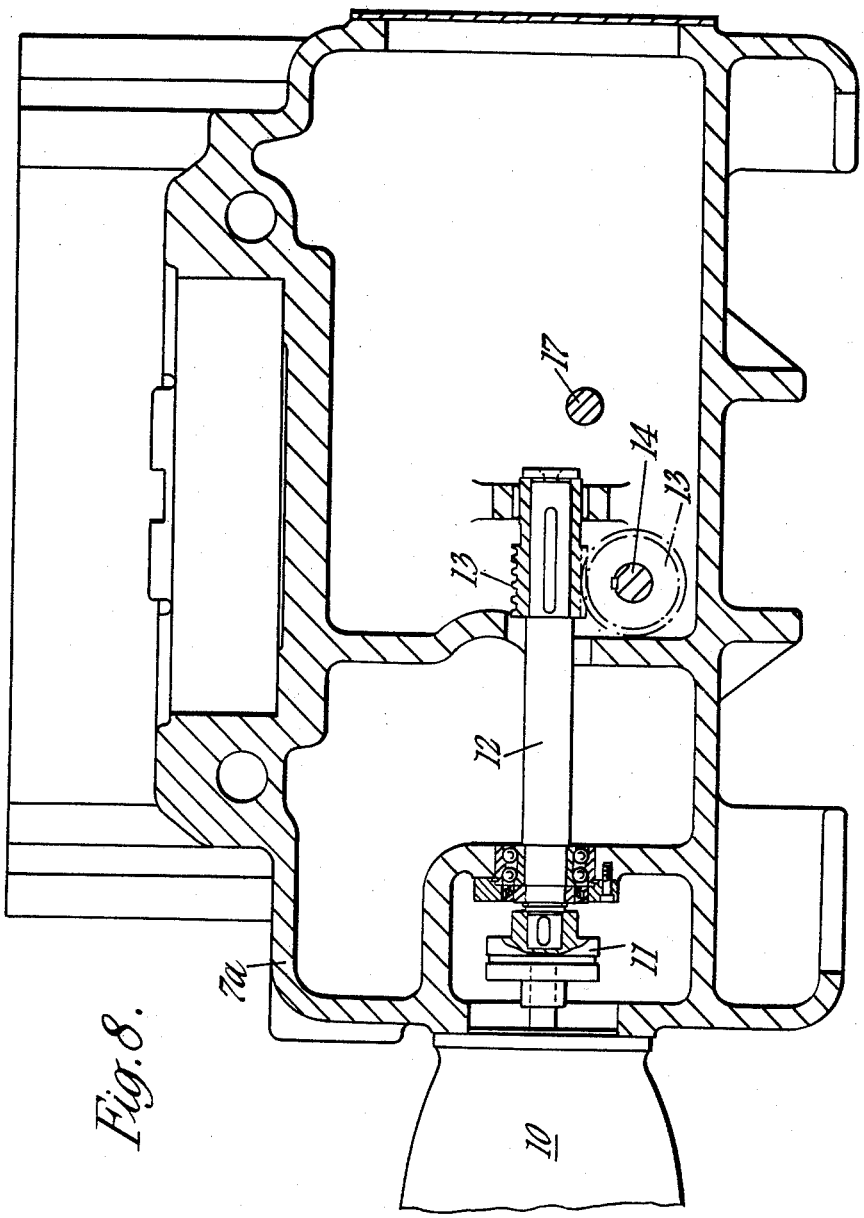

FIGURES 3A and 3B together show a sectional plan view of the knee and showing a developed or exploded arrangement of the means for rotating the traverse feed screw and the up-feed screw;

FIGURE 4 is a front elevation of the knee;
FIGURE 5 is a plan view of the knee;
FIGURE 6 is a section on the line 6—6 of FIGURE 5;
FIGURE 7 is a section on the line 7—7 of FIGURE 5;
FIGURE 8 is a section on the line 8—8 of FIGURE 5;
FIGURE 9 is a plan view of the switches controlling the up-feed and the means for operating said switches;

FIGURE 10 is a plan view of part of the switch operating means; and

Figure 11:
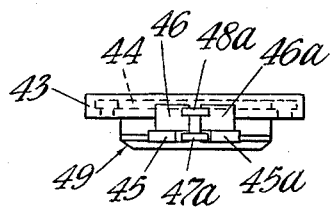

FIGURE 11 is a plan view of the switch operating means controlling the traverse of the table.

Figure 2:
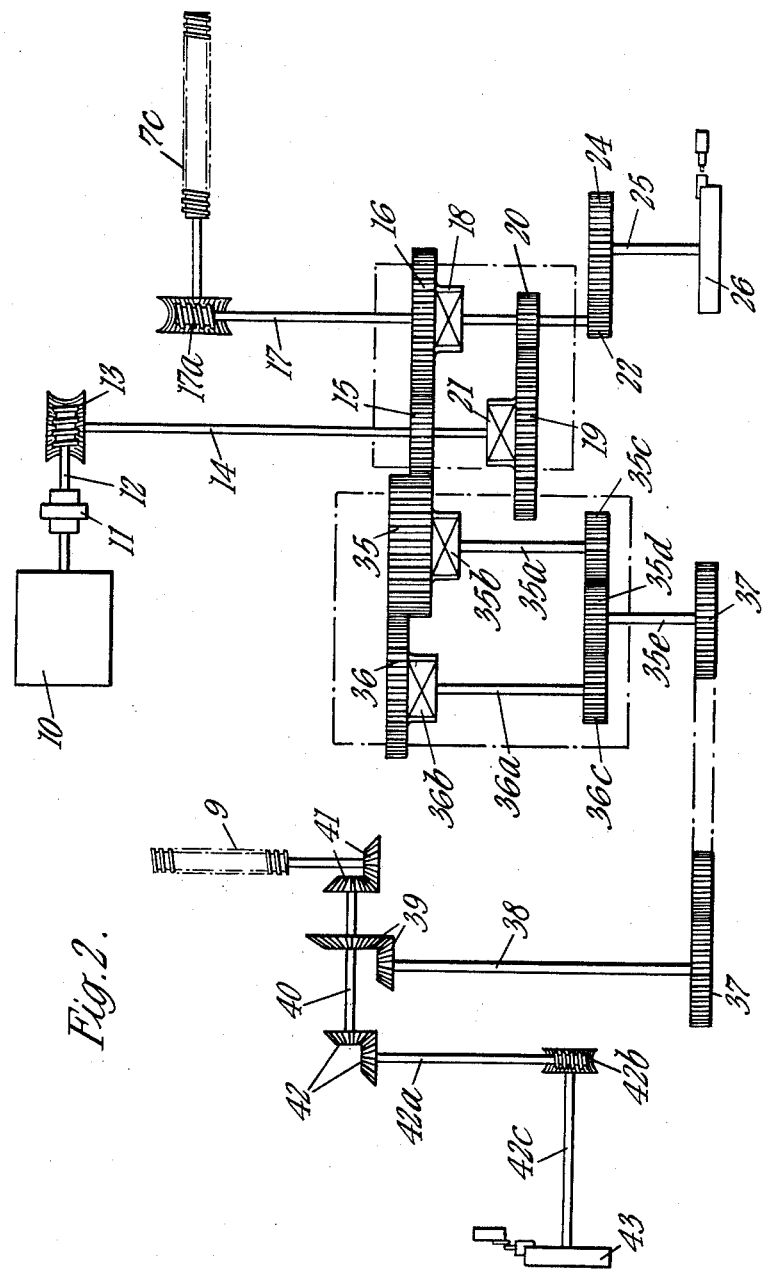
FIGURE 2 shows diagrammatically the means for rotating the traverse feed screw and the up-feed screw of the machine shown in FIGURE 1.

As shown in the drawings the gear shaving machine is provided with a frame 7 on which is mounted a knee 7a vertically adjustable on ways 7b by means of an up-feed screw 7c. Supported by the knee is the gear support table 8 which carries stocks by which the gear to be finished and designated 8a is freely rotatably supported. The gear support table 8 is mounted on the knee to be traversed in any desired path by means of a feed screw 9, see FIGURE 2.

In preference the means for traversing the table is as set forth in co-pending United States of America patent application Serial Number 23,507.

Surmounting the table and carried by a forwardly projecting part of the machine frame is a power driven tool 9a, the tool and the gear having conjugate teeth.

The two feed screws are driven by means of a single reversible motor 10 mounted on the knee 7a.

The means by which the vertical feed screws 7c is driven will first be described.

The motor 10, through a coupling 11, drives a transmission shaft 12 which by worm and worm-wheel gearing 13 drives a first shaft 14 which has keyed thereon a first gear wheel 15 which meshes with a gear wheel 16 free on a second shaft 17 parallel with the first shaft. The shaft 17 drive the feed screw 7c through a worm and worm wheel drive 17a. Shaft 17 carries an electro-magnetic clutch 18 which, when energised, locks the gear wheel 16 thereon so that the drive is then transmitted to the second shaft through the inter-meshing gear wheels 15 and 16. Said gear wheels are such as will transmit a low speed up-feed.

Loose on the first shaft 14 is a further gear wheel 19 which meshes with a gear wheel 20 keyed on the second shaft 17, said inter-meshing gear wheels being such as will transmit a relatively high speed transmission to the second shaft 17 and thereby a fast up-feed. Also on the first shaft is an electro-magnetic clutch 21 which, when energised, locks its freely running gear wheel 19 to its shaft.

It will be seen that with the motor running and with neither clutch energised no drive is transmitted to the vertical feed screw 7c. When the clutch 18 is energised the slow up-feed to the knee is transmitted through intermeshing gears 15 and 16 and when clutch 21 is energised the up-feed is relatively fast, the drive to the feed screw being transmitted through the inter-meshing gears 19 and 20. It will also be seen that by reversing the motor and energising the clutch 21 the knee can be moved quickly downwards.

The shaft 17 has also fast thereon a gear wheel 22 which meshes with a relatively large gear wheel 24 fast on a short shaft 25 on which is secured a disc 26. This disc will always rotate when the table is being raised and lowered and will occupy a definite rotational position corresponding to the vertical position of the knee. The disc, which can be locked firmly to its shaft by means of a cone locking screw 27, is provided near its periphery with a T slot 28 in which are fitted trip dogs arranged to co-operate with four micro-swicthes A, B, C and D. The first trip dog 29 is provided with two cam faces or lobes 29a and 29b. Following behind this trip dog is a series of trip dogs 30, the number thereof depending on the number of feed increments desired. In FIGURE 4 two trip dogs 30 are shown. Following behind is a trip dog 31 with lateral extension 32. There is a further trip dog 33 remote from that last mentioned. Said trip dogs are arranged to operate said micro-switches as and for the purpose hereafter set forth.

On the face of said disc is a circumferentially graduated plate 34 which shows the relative positions of the trip dogs and which enables the trip dogs to be positioned relative to each other in accordance with the desired up-feed increments.

The means by which the traverse feed screw 9 is driven will now be described.

The aforesaid gear wheel 15 which is keyed to the shaft 14 meshes with the first of two inter-meshing and similar gear wheels 35 and 36 loose on their respective shafts 35a and 36a and on said shafts are electro-magnetic clucthes 35b and 36b respectively which, when energised, lock the respective gear wheel to its shaft so that the latter is driven thereby. Said shafts have fast thereon inter-meshing gear wheels 35c and 36c. In FIGURE 3 said wheels are not shown in mesh as this is a developed or exploded view. Gear wheel 35c meshes with gear wheel 35d fast on a short shaft 35e to the foot of which is fast the first of a series of inter-meshing gear wheels 37, the last of which is fast on a shaft 38 which, through bevel gearing 39, drives a shaft 40. The latter, through bevel gearing 41, see FIGURE 2, drives the traverse feed screw.

As already stated FIGURE 3 is a developed view and the shaft 38 is shown exterior to the knee. Its position within the knee is indicated by its centre line likewise designated by the numeral 38. It will be apparent that by energising one of said clutch 35b or 36b, hereafter referred to as the forward stroke clutch, the table can be traversed in one direction and by de-energising said clutch and energising the other clutch, hereafter referred to as the reverse stroke clutch, the travel of the table will be reversed.

The shaft 40 of the table traverse drive is coupled through bevel gearing 42, a shaft 42a, a worm and worm-wheel drive 42b and a shaft 42c to a second rotatable disc 43. This disc has a circumferential T slot 44 in which are fitted trip dogs 45, 45a and 46 and 46a, arranged to co-operate with rollers 47a and 48a of the switch arms of micro-switches 47 and 48 as hereafter described. Switch 47 is a reversible switch to control alternately the energising of the forward and reverse stroke clutches 35b and 36b while the other switch 48 is an over-travel limit switch. Said disc carries a suitably graduated plate 49 to indicate the position of the trip dogs 45, 45a, 46 and 46a relative to the traverse of the table.

It will be appreciated that said disc 43 is rotated in one direction in synchronism with the forward traverse stroke of the table and in the other direction in synchronism therewith during the reverse stroke. The first of said micro-switches fulfills a double function. When contacted it reverses the traverse of the table and it energises the clutch 18 to initiate a slow up-feed increment.

Assume that a gear to be finished is supported by the table 8 and the latter is in its lowered position. The motor switch is now closed to drive the motor 10 in a direction to effect the up-feed and to traverse the table. The closing of said switch automatically energises the clutch 21 so that the up-feed screw 7c is rotated to give a quick up-feed to the knee and table the drive being transmitted to the screw 7c through shaft 12, gearing 13, shaft 14, intermeshing gears 19 and 20, shaft 17 and gearing 17a.

During the up-feed of the knee the first disc 26 is rotated synchronously therewith through the intermeshing gears 22 and 24 and at the end of the desired quick up-feed the first lobe 29a of the first trip dog 29 on said disc contacts micro-switch D. This switch then de-energises the said clutch 21 and energises the low speed clutch 18, which latter is immediately thereafter de-energised by the second lobe 29b. The table is thereby accurately positioned with respect to the tool 9a so that the latter is in mesh with the gear 8a for making the first finishing traverse.

Meantime the table is being traversed by the feed screw 9 the drive being transmitted thereto through shaft 12, gearing 13, shaft 14, inter-meshing gear wheels 15 and 35, the train of gears 37 and bevel gearing 39 and 41, the appropriate clutch 35b or 36b being energised.

The second disc 43 is rotated in synchronism therewith. When the full traverse stroke is completed a trip dog 45 or 45a on said disc contacts the arm of the reversible switch 47 which functions to energise the low up-feed clutch 18 and to reverse the traverse stroke by energising the appropriate clutch 35b or 36b, the other clutch being de-energised. The knee is thereby given a slow small up-feed which is stopped when the next trip dog 30 on the first disc 28 contacts with switch D. At the end of the reverse stroke a trip dog 45 or 45a on the second disc contacts the reversible micro-switch to again reverse the traverse of the table and to energise the slow feed clutch 18 so that a further slow up-feed increment is initiated.

In the event of the reversible switch failing to function the arm of the over-travel limit micro-switch 48 is contacted by a trip dog 46 or 46a, said switch then cutting out the motor.

In like manner the table may be caused to effect any desired number of small slow speed up-feed increments at the end of each traverse of the table.

When the full up-feed is completed the extension 32 of trip dog 31 contacts micro-switch C. This switch is brought into operation for the first time and functions to give a signal to an electrical circuit by which the table can be traversed any number of times without further up-feed, i.e. without energising the up-feed clutches. This serves to size automatically the gear.

When the desired number of strokes has been completed the motor is reversed by closing an appropriate switch, the fast up-feed clutch 21 being simultaneously energised. The table is thereby quickly returned to its initial position.

During the downward movement of the knee the first disc, which still maintains a fixed rotational position relative to the position of the knee, is rotated until trip dog 33 contacts micro-switch A. This switch, when contacted, serves to de-energise said fast up-feed clutch 21 and to switch off the motor.

This completes the cycle of operations, the machine now being in a position to receive a further gear to be finished.

In the event of micro-switch C failing to function and in-feed and rotation of the disc 26 continuing the aforesaid extension 32 of trip dog 31 will contact micro-switch B which is in the same plane as switch C. Switch B, when contacted, operates to cut out the motor so that up-feed is arrested. Switch B is positioned relative to switch C so that it will be so contacted when there has been an in-feed in the region of 0.001" after switch C has been contacted.

It is preferred that the rotor of the motor is tapered and when the field current is switched on a component of the electro-magnetic force quickly moves the rotor axially to release it from a conical friction brake. When such motor is switched off the tapered rotor is driven axially on to the conical friction brake by a powerful spring. When the motor is switched off the braking is extremely reliable and accurate. This is important to ensure that as the knee is moved rapidly downwards such movement is stopped quickly and accurately in response to the operation of micro-switch A.

This is a known type of motor and therefore such construction is not illustrated in the drawings.

It will be noted that the motor is reversed only at the end of a finishing operation and at the end of the downfeed of the knee, the reversal of the table being effected by reversing gear controlled by electro-magnetic clutches 35b and 36b.

The number of up-feed increments can be varied in number and size as may be desired. Thus, if six up-feeds are found necessary six trip dogs would be provided on the first disc and they could be set to produce up-feeds as follows—

.002"
.002"
.001"
.001"
.0005"
.0005"

If a change is required this can quickly be accomplished by adjusting the trip dogs, and a set of up-feeds could be achieved as rollows—

.002"
.002"
.001"
.001"
.001"
.001"

In a modification micro-switch D, when contacted by the first lobe of the first trip dog, operates to stop the motor, the motor brake being then applied automatically so that the up-feed is abruptly arrested. An electrical circuit, after a short time interval, starts the motor again with the fast up-feed clutch de-energised and the slow speed clutch energised. The second lobe then functions to de-energise the slow speed clutch. Such arrangement ensures accuracy in positioning the gear preparatory to the first traverse stroke of the table.

What I claim is:

1. A gear shaving machine of the kind set forth provided with a single reversible motor, in-feed and traverse feed screws for said machine, gearing comprising two gearing paths connecting said motor and said in-feed screw to give an initial quick in-feed and a relatively slow in-feed, a first electro-magnetic clutch incorporated in said gearing and energized on closing the motor circuit to transmit a quick in-feed via one said gearing path, a second electro-magnetic clutch also incorporating said gearing and energized to transmit a relatively slow in-feed via the other said gearing path, switch operating means rotated in synchronism with the in-feed screw and which has at all times a rotational position corresponding to the in-feed position of the table, a switch operated by the switch operating means to deenergize the first said clutch and thereby interrupt the quick in-feed, reversible gearing between the motor and the traverse feed screw, two electro-magnetic clutches incorporated in said gearing and controlling the direction of drive transmitted by said gearing, further switch operating means rotated in synchronism with and in a direction corresponding to the traverse of the table and a switch operated by said switch operating means which, when contacted, reverses the energizing of the two clutches in the traverse gearing and energizes the clutch through which the slow in-feed is transmitted, whereby a quick initial in-feed and thereafter a relatively slow and short in-feed increment synchronized with the reversal of the traverse of the table is provided.

2. A machine as claimed in claim 1 wherein the switch operating means rotated in synchronism with the in-feed comprises a rotary member provided with a plurality of trip dogs adjustably secured to the disc, each trip dog in turn contacting the switch to arrest the in-feed of the table and the position of the trip dogs relative to each other determining the extent of successive increments of in-feed.

3. A machine as claimed in claim 2 wherein the rotary member is provided with a trip dog which after the last increment of in-feed contacts a switch which gives a signal by which the table can be given any number of traverses without in-feed.

4. A machine as claimed in claim 3 wherein the rotary member is provided with a still further trip dog which contacts a further switch which, when the table is lowered, de-energises the energized clutch and cuts out the motor.

5. A machine as claimed in claim 3 provided with a limit switch and a further trip dog carried by the rotary member which trip dog contacts the limit switch in the event of the switch giving the signal failing to function, the limit switch, when contacted, switching off the motor.

References Cited in the file of this patent
UNITED STATES PATENTS

| | | |
|---|---|---|
| 1,683,581 | Shaw | Sept. 4, 1928 |
| 2,380,261 | Praeg | July 10, 1945 |
| 2,581,700 | Praeg | Jan. 8, 1952 |
| 2,585,261 | Mentley | Feb. 12, 1952 |
| 2,757,579 | Stephan | Aug. 7, 1956 |